United States Patent
Cromer et al.

(10) Patent No.: US 7,652,995 B2
(45) Date of Patent: Jan. 26, 2010

(54) AUTONOMIC REASSOCIATION OF CLIENTS IN A WIRELESS LOCAL AREA NETWORK

(75) Inventors: Daryl Carvis Cromer, Apex, NC (US); Philip John Jakes, Durham, NC (US); Howard Jeffrey Locker, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 10/742,422

(22) Filed: Dec. 19, 2003

(65) Prior Publication Data

US 2005/0135249 A1 Jun. 23, 2005

(51) Int. Cl.
H04L 12/28 (2006.01)

(52) U.S. Cl. ............... 370/235; 370/230; 455/424; 455/445

(58) Field of Classification Search ......... 370/229–232, 370/235–237, 216–218, 221; 455/422.1, 455/423, 424, 445
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,487,133 A | * | 1/1996 | Park et al. | 706/20 |
| 5,506,839 A | * | 4/1996 | Hatta | 370/236 |
| 5,594,731 A | | 1/1997 | Reissner | |
| 5,654,959 A | | 8/1997 | Baker et al. | |
| 6,067,297 A | | 5/2000 | Beach | |
| 6,144,855 A | | 11/2000 | Slovin | |
| 6,188,681 B1 | | 2/2001 | Vesuna | |
| 6,215,779 B1 | | 4/2001 | Bender et al. | |
| 6,226,277 B1 | * | 5/2001 | Chuah | 370/328 |
| 6,269,395 B1 | | 7/2001 | Blatherwick et al. | |
| 6,332,077 B1 | | 12/2001 | Wu et al. | |
| 6,345,043 B1 | * | 2/2002 | Hsu | 370/324 |
| 6,377,549 B1 | * | 4/2002 | Ngo et al. | 370/233 |
| 6,393,261 B1 | | 5/2002 | Lewis | |
| 6,393,484 B1 | | 5/2002 | Massarani | |

(Continued)

FOREIGN PATENT DOCUMENTS

EP 1133208 A2 9/2001

(Continued)

OTHER PUBLICATIONS

Asoh, Junichi et al, "Improved Wireless Network Connection System and Method," U.S. Appl. No. 10/645,402, IBM Docket JP920020130US1, filed Aug. 21, 2003.

(Continued)

*Primary Examiner*—Aung S Moe
*Assistant Examiner*—Curtis A Alia
(74) *Attorney, Agent, or Firm*—Hoffman & Warnick LLP

(57) ABSTRACT

A wireless network access point is described which provides the resources of a backbone network to wireless clients. The access point is able to detect a degraded condition on the backbone network. Upon detecting the degraded condition, the access point transmits or broadcasts a reassociation request to one or more clients associated with the access point. In addition, the rate at which new associations are made is halted or reduced during the degraded backbone condition. In one embodiment, the association rate is reduced by increasing the interval between beacons transmitted by the access point which identify the access to the backbone network.

9 Claims, 7 Drawing Sheets

U.S. PATENT DOCUMENTS

| | | | |
|---|---|---|---|
| 6,473,413 B1 | 10/2002 | Chiou et al. | |
| 6,505,045 B1 | 1/2003 | Hills et al. | |
| 6,522,881 B1 | 2/2003 | Feder et al. | |
| 6,678,244 B1 * | 1/2004 | Appanna et al. | 370/229 |
| 6,747,954 B1 * | 6/2004 | Petersen et al. | 370/236 |
| 6,763,014 B2 * | 7/2004 | Kennedy | 370/338 |
| 6,920,107 B1 * | 7/2005 | Qureshi et al. | 370/230 |
| 7,068,624 B1 * | 6/2006 | Dantu et al. | 370/331 |
| 7,151,938 B2 * | 12/2006 | Weigand | 455/452.1 |
| 7,161,902 B2 * | 1/2007 | Carter et al. | 370/229 |
| 7,162,250 B2 * | 1/2007 | Misra | 455/453 |
| 7,221,648 B2 * | 5/2007 | Das et al. | 370/231 |
| 7,239,611 B2 * | 7/2007 | Khisti et al. | 370/230 |
| 2002/0122385 A1 * | 9/2002 | Banerjee | 370/229 |
| 2003/0065736 A1 * | 4/2003 | Pathak et al. | 709/212 |
| 2003/0086407 A1 * | 5/2003 | Bhatt et al. | 370/345 |
| 2003/0092392 A1 * | 5/2003 | Komandur et al. | 455/67.1 |
| 2003/0128690 A1 * | 7/2003 | Elliott et al. | 370/351 |
| 2003/0212802 A1 * | 11/2003 | Rector et al. | 709/228 |
| 2003/0214905 A1 * | 11/2003 | Solomon et al. | 370/229 |
| 2004/0013128 A1 * | 1/2004 | Moreton et al. | 370/447 |
| 2004/0018839 A1 * | 1/2004 | Andric et al. | 455/433 |
| 2004/0022222 A1 * | 2/2004 | Clisham | 370/338 |
| 2004/0068668 A1 * | 4/2004 | Lor et al. | 713/201 |
| 2004/0085928 A1 * | 5/2004 | Chari et al. | 370/329 |
| 2004/0116140 A1 * | 6/2004 | Babbar et al. | 455/517 |
| 2004/0192284 A1 * | 9/2004 | Vaisanen et al. | 455/422.1 |
| 2005/0135284 A1 * | 6/2005 | Nanda et al. | 370/294 |

FOREIGN PATENT DOCUMENTS

WO     WO 02/087169 A2     10/2002

OTHER PUBLICATIONS

Grover, G.A. et al, "Protocol for Seamless Mobility Transitions in Transparent Bridging Local Area Networks," IBM Technical Bulletin, vol. 38, No. 11, Nov. 1995, pp. 421-422.

China IP Law, Information Disclosures Statement, Jun. 27, 2008, 1 page.

* cited by examiner

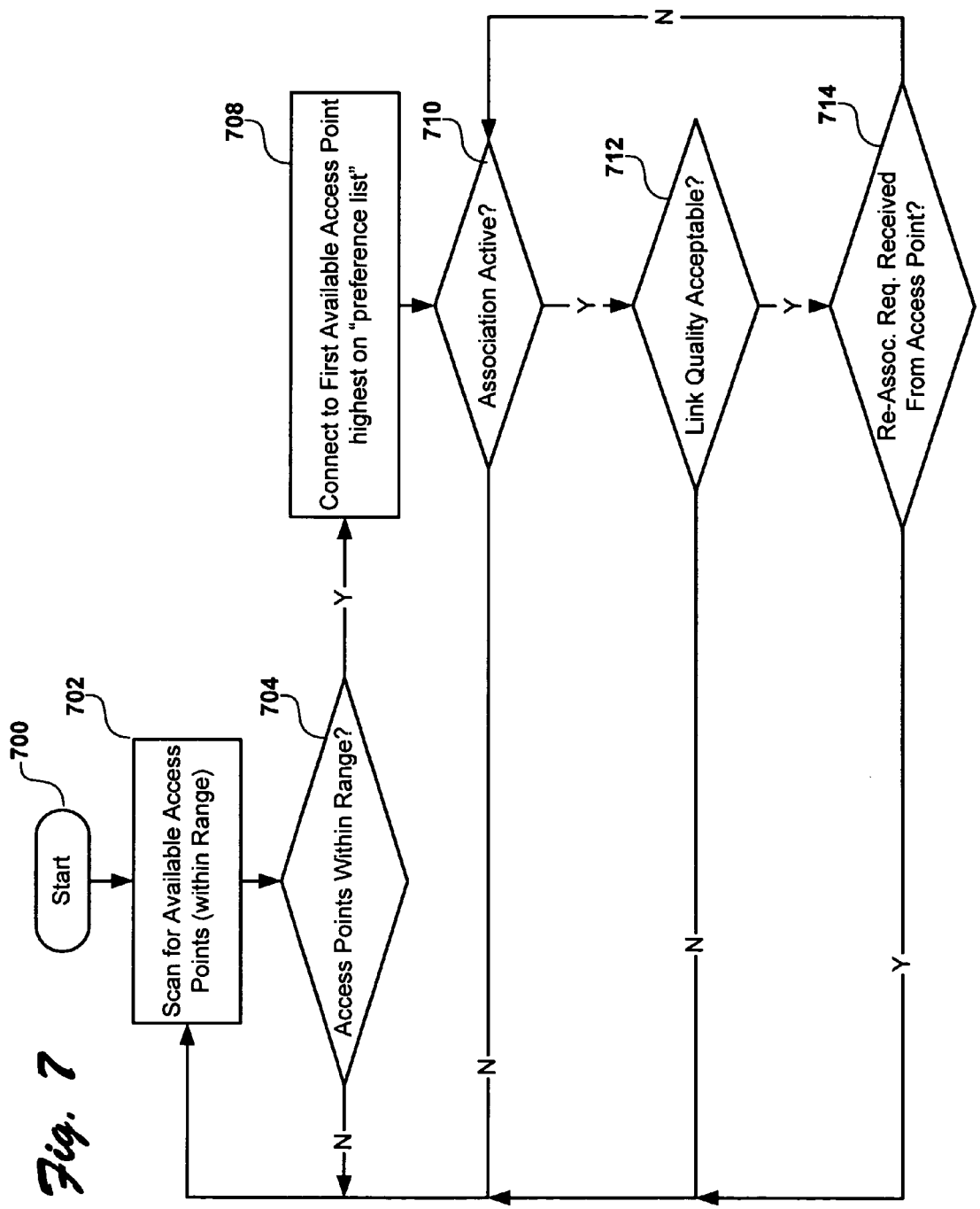

AUTONOMIC REASSOCIATION OF CLIENTS IN A WIRELESS LOCAL AREA NETWORK

BACKGROUND OF THE INVENTION

This invention pertains to wireless networking systems and, more particularly, to a wireless network access point which provides the resources of a backbone network to wireless clients. The access point is able to detect a degraded condition on the backbone network and inform clients of the degraded condition.

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk to suffer outages. This increasing complexity, in conjunction with a shortage of skilled information technology professionals, points towards an inevitable need to automate many of the functions associated with computing today.

Autonomic computing is one proposal to solve this technological challenge. Autonomic computing is a concept to build a system that regulates itself much in the same way that a person's autonomic nervous system regulates and protects the person's body.

Within the past decade, there has been accelerated growth in portable computing to meet the demands of a mobile workforce. This voluminous mobile workforce has traditionally relied on a cable connection to a backbone network in order to have access to resources such as printers, e-mail servers, databases, storage, and even Internet connections. Within the past few years alone, the industry has seen rapid deployment of wireless local area networks which offer increased convenience over cable connections to backbone networks. In addition to convenience, wireless networks offer the ability to roam while maintaining a network connection.

Recently, a standard for wireless local area networks known as the IEEE 802.11 standard has been adopted and has gained acceptance among the industrial, scientific and medical communities. The IEEE 802.11 standard for wireless networks is a standard for systems that operate in the 2,400-2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems.

In a wireless local area network, wireless clients obtain access to resources on the backbone network through the use of an access point. The backbone network is typically on a wired network, such as ethernet, but can also be a second wireless network or any combination thereof. When an access point provides connectivity to resources directly on a wired network, the access point will contain, amongst other things, a wired LAN interface, a bridge function, and a wireless LAN interface in order to bridge traffic between the wireless network and the wired network.

Most installations use wireless local area networks as an overlay to an existing ethernet (cabled or wired) network which serves as a backbone or provides access to a backbone and its resources. Typically, access points are provided at various locations to create continuous geographical coverage for the wireless network. Since 802.11 is limited to 30 meters in range and Ethernet is physically limited to 100 meters in length, office environments typically deploy several access points on different backbones. The various wireless access points are assigned to different wireless frequency spectra or channels to allow overlap between wireless ranges.

Constituent components of an access point typically include a LAN interface, a LAN hub, a bridge function, and a wireless LAN interface. Software is executed for performing router and network address translation functions. The constituent components typically act as independent units, i.e., peer-to-peer LAN, LAN backbone, and as independent peer-to-peer wireless LAN, for example. This independent operation of access point components allows for the access point to be very flexible.

A problem emerges, however, as a result of this independent operation of access point components. When a first ethernet backbone goes down the wireless LAN interface component of the access point continues to operate by providing independent peer-to-peer wireless LAN functionality. As such, wireless peer-to-peer clients are able to share mapped drives and other resources found on the wireless network. However, users connected to the access point are unable to reach network resources found on the first ethernet backbone. Meanwhile, another client in the same physical area which happens to be connected to a different access point which is connected through a second ethernet backbone can remain operational with full access to backbone resources. This resulting inconsistency in network resource availability is problematic because it raises the level of frustration for the users affected and raises the cost of computing as a direct result of increased help center calls.

A challenge found, however, is in mitigating this inconsistent network availability of clients according to autonomic computing principles.

SUMMARY OF THE INVENTION

It has been discovered that the aforementioned challenges are resolved by transmitting a reassociation request to one or more clients associated with an access point when it is detected that a degraded condition exists on the network which serves as the backbone for the wireless network. The most efficient way to implement the reassociation request of clients is by means of a broadcast to all clients indicating the same. However, individual reassociation requests to clients are also effective.

Another aspect of the present invention includes the type of information included in the reassociation request. The reassociation request, whether by broadcast or by individual packets, can have information as to the level of degraded performance of the backbone network and can include other information useful to clients. Once the clients have been informed of the degraded performance, the clients are then free to seek access to the backbone network through other access points which may be available in the geographical area where the client resides and which are not experiencing degraded performance.

In a specific embodiment, in addition to transmitting the reassociation request, the rate at which clients are further associated to the wireless network is reduced. This association rate reduction is performed in response to the detection of the degraded condition.

In another specific embodiment, where beacons are normally transmitted at a particular interval in order to identify an access point's availability and in addition to transmitting the reassociation request, the transmission of beacons are halted. Halting the transmission of beacons in this manner reduces the chances that a client attempting to obtain access the resources found on the backbone network will associate with an access point experiencing degraded performance with respect to the backbone network.

In another specific embodiment, further association of clients is refused altogether in response to detecting a degraded performance condition. This embodiment is particularly useful in the case where clients actively beacon in attempting to associate with the access point.

BRIEF DESCRIPTION OF THE DRAWINGS

Some of the purposes of the invention having been stated, others will appear as the description proceeds, when taken in connection with the accompanying drawings, in which:

FIG. 7 is a flow diagram depicting the logic exercised by the client of FIG. 3 in maintaining and/or establishing association with the access point of FIG. 2 wherein the client of FIG. 3 implements additional functionality capable of responding to a reassociation request transmitted by the access point of FIG. 2.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in a specific embodiment," and similar language throughout this specification may, but do not necessarily, all refer to the same embodiment.

Figure 1:
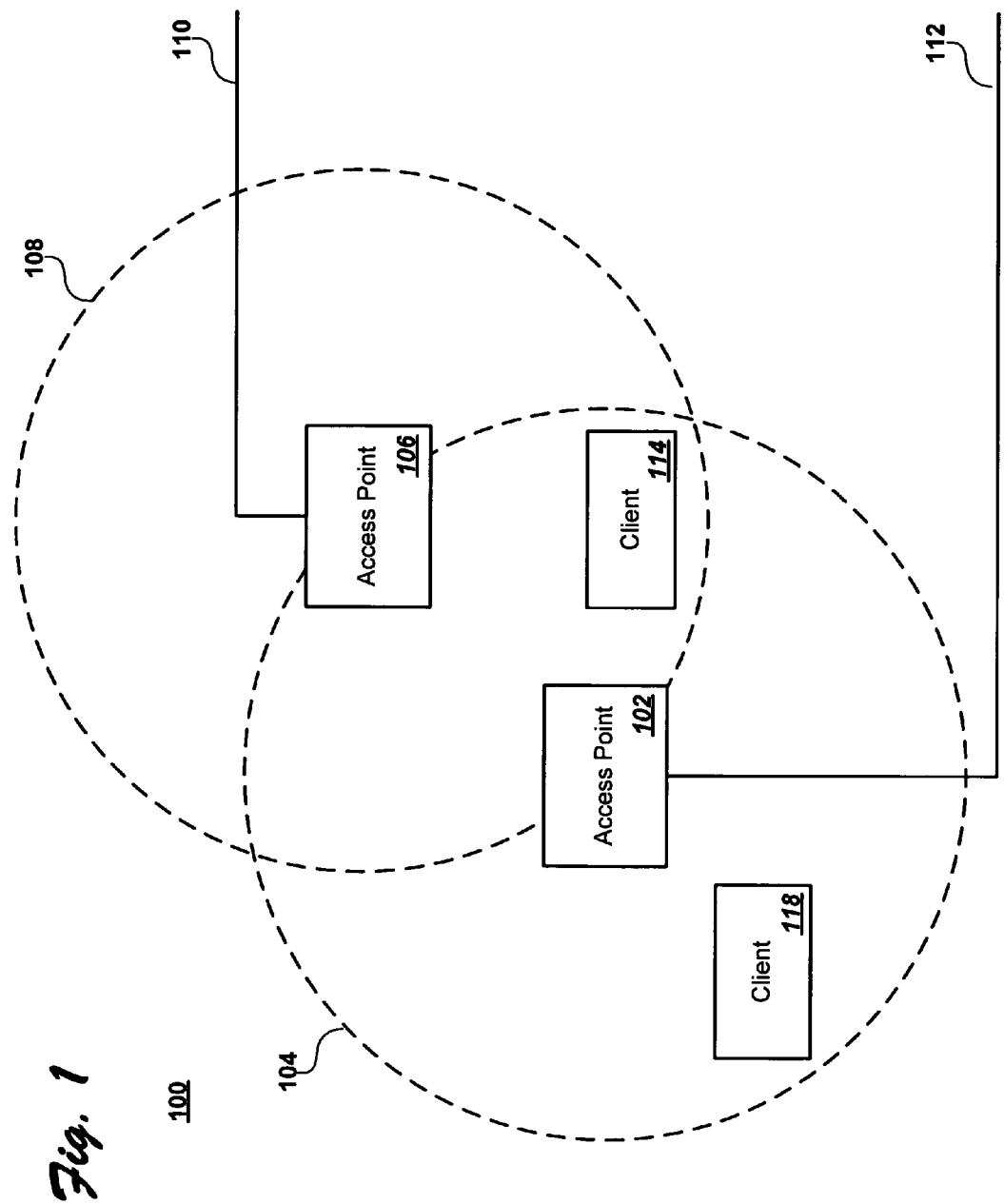
FIG. 1 depicts a scenario in which the concepts of the present invention are advantageous.

Referring now more particularly to the accompanying drawings, FIG. 1 depicts a scenario in which the concepts of the present invention are advantageous. Installation 100 consists of two access points 106 and 102 each having roughly circular geographical areas of coverage 108 and 104 respectively. Access points provide access to distributed resources and services via wireless medium for associated wireless clients or stations. Preferably, access points 106 and 102 contain IEEE 802.11 medium access control functionality and physical layer interface to the wireless medium. Wireless clients 114 and 118 are used here to represent a variety of wireless clients throughout installation 100. The wireless clients 114 and 118 are typically and preferably mobile computing units such as laptops and palmtops. As mobile units, clients 114 and 118 typically would not have printing capabilities nor other resources which would require hardware too large to hand carry. Such printing capabilities and other resources are found on backbone networks 110 and 112 which are coupled, according to installation 100, to two access points 106 and 102 respectively. Access points 106 and 102, in turn, provide the resources and services of the backbone network on to the wireless network in order to make the resources and services available to the wireless clients 114 and 118.

Backbone networks 110 and 112 provide installation 100 with the distributed resources and services. The resources and services include but are not limited to print servers and printers, e-mail servers, fax servers, database servers, and Internet access. Backbone networks 110 and 112 are preferably ethernet local area networks, optionally however, connections 110 and 112 can be wireless or optical distribution schemes to the same resources and services. In addition, backbone connections 110 and 112 can be bridge connections which in turn provide the resources and services of the backbone network.

Wireless clients 114 and 118 and are able to be configured in ad hoc mode and thereby engage in direct peer-to-peer data transfers and sharing of each other's resources when their respective signal strengths allow for direct connection. Otherwise, clients 114 and 118 are able reach each other through the backbone networks 110 and 112; in which case, their communications would be through the access points to which they are associated.

Figure 2:
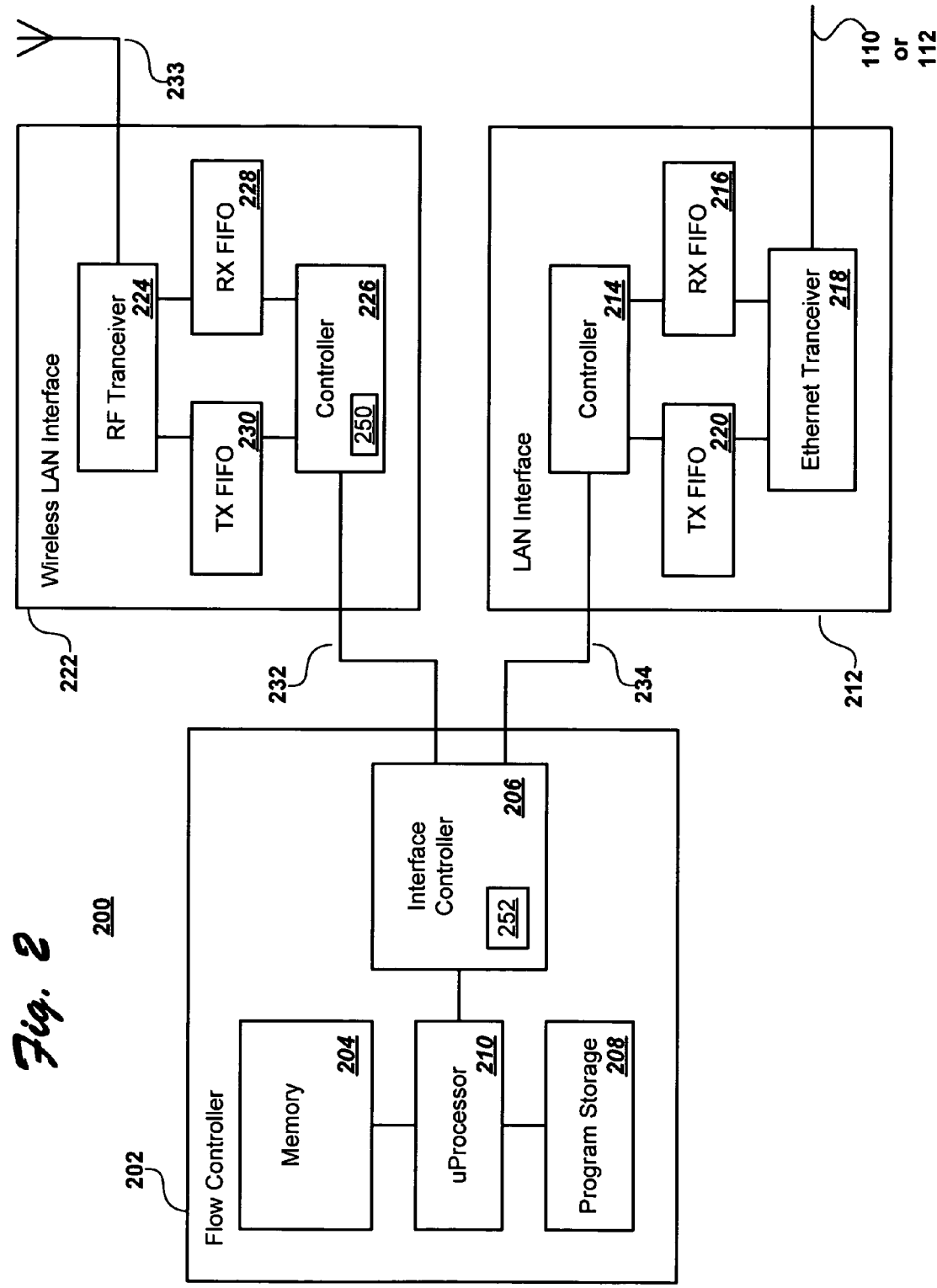
FIG. 2 is a block diagram of an access point configured according to an embodiment of present invention.

FIG. 2 is a block diagram of an access point configured according to an embodiment of present invention. Access point 200 includes wireless LAN interface 222, a bridge FIFO or flow controller 202, and a LAN interface 212. Wireless interface 222 can be any wireless interface using any wireless medium such as RF, infrared, VHF, UHF, and microwave. However, in the preferred embodiment, wireless LAN interface 222 is implemented as an 802.11 compliant wireless local area network interface. LAN interface 212 can be a wired land-based network interface, an optical network interface such as a fiber-optic network interface, or even a second wireless network interface. However, in the preferred embodiment, LAN interface 212 is implemented as an interface for an ethernet land-based network. LAN interface 212 typically connects to or bridges to a backbone network which provides resources and services. Wireless LAN interface 222 provides the resources and services found on the backbone network to wireless clients which are associated to wireless LAN interface 222.

The term—association—as used herein refers to that service which is used to establish access point to client mapping and enable client invocation of the resources and services found on the backbone network.

Bridge FIFO/flow controller 202 bridges and controls the flow of traffic between wireless clients coupled through wireless LAN interface 222 and the backbone network coupled to LAN interface 212. Flow controller 202 maintains a FIFO buffer for bidirectional traffic between interfaces 222 and 212. Flow controller 202 can be implemented entirely in hardware, or partially in hardware and partially in software/firmware. In the preferred embodiment as shown in FIG. 2 however, flow controller 202 is implemented with a microprocessor 210 having program storage 208 which stores boot code and microcode for execution on a microprocessor 210. The boot code is typically executed directly from program storage 208 while the microcode is typically transferred to memory 204 for faster execution. Flow controller 202 also includes an interface controller 206 which performs the lower-level functions including handshaking functions required across interface 232 to the wireless LAN interface 222 and across interface 234 to the LAN interface 212.

The construction of wireless LAN interface 222 includes a physical layer RF transceiver 224, transmit and receive FIFO's 230 and 228 respectively, and a low-level controller 226 for interfacing to the flow controller via interface 232. Wireless LAN interface 222 includes an antenna 233 for coupling electromagnetic energy to the atmosphere. Notice that the term—RF—is used herein as to be consistent with the IEEE 802.11 specifications. Throughout the IEEE 802.11 specifications the direct sequence spread spectrum (DSSS) system therein described targets an RF LAN system having a carried frequency in the 2.4 GHz band designated for industrial, science, and medical (ISM) applications as provided in the USA according to FCC 15.247. In other words, the actual modulation frequencies used by the RF transceiver 224 are in the 2.4 GHz microwave ISM band rather than in the frequency band traditionally known as "RF."

The construction of LAN interface 212 includes a physical layer ethernet transceiver 218, transmit and receive FIFO's 220 and 216 and a low-level controller 214 for interfacing to the flow controller via interface 234. Ethernet transceiver 218 is coupled to the backbone network 110 or 112.

Controller's 226 and 214 can be implemented in hardware, or as a combination of hardware and software/firmware components. In the preferred embodiment however, controllers 226 and 214 are implemented in hardware for faster operation.

Wireless LAN interface 222 and LAN interface 212 implement at least the physical and medium access control layers of the ISO LAN networking model. Higher ISO layers are implemented in the flow controller 202. However, it is possible to implement the higher layers of the ISO model in interfaces 222 and 212.

Further details concerning the construction and use of access point 200 shall be described in relation to the flow charts which follow. Certain details concerning the construction and use of access points are well known in the art and are omitted so as to not obfuscate the present disclosure in unnecessary detail.

Figure 3:
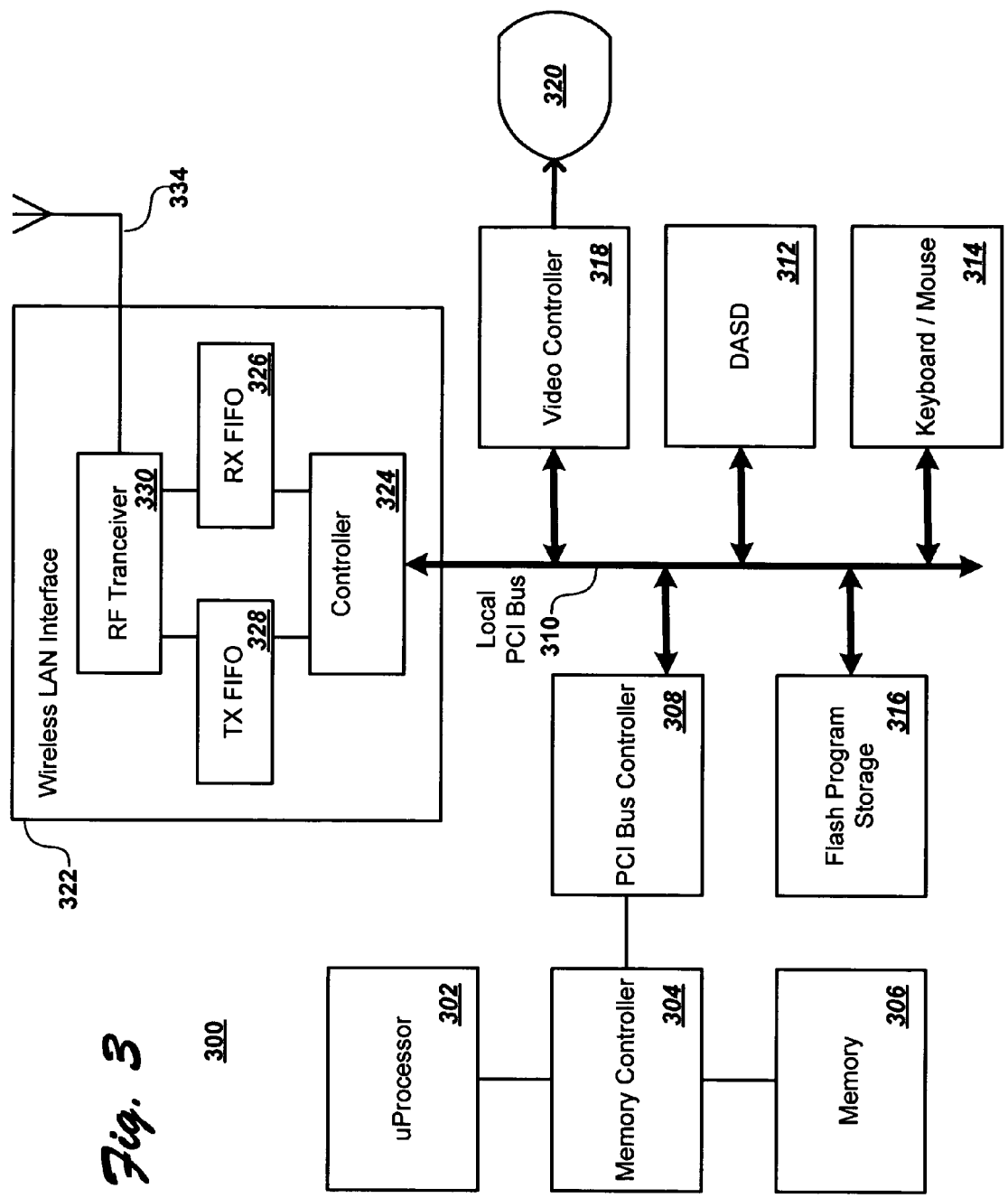
FIG. 3 is a block diagram of a client configured according to an embodiment of the present invention.

FIG. 3 is a block diagram of a client configured according to an embodiment of the present invention. The client 300 includes a physical layer RF transceiver 322, transmit and receive FIFO's 328 and 326 respectively, and a low-level controller 324 for interfacing to other components of client 300 through PCI bus 310. Wireless LAN interface 322 includes an antenna 334 for coupling electromagnetic energy to the atmosphere. Controller 300 further includes video controller 318 which provides control signals to video LCD display 320. PCI bus controller 308 operationally couples a variety of modules within client 300. A standard processing subsection is coupled to PCI bus controller 308 and consists of a microprocessor 302, a memory controller 304, and to memory 306. Microprocessor 302 receives its boot code from flash program storage 316 through PCI bus controller 308. A storage module 312 provides the client with DASD storage for storing application software and application data, and for storing and executing operating system code. Client 300 also includes a keyboard and mouse interface 314 which is coupled to PCI bus controller 308. Keyboard and mouse interface 314 accepts user input from a supplied keyboard and mouse. Establishing association and wireless connection to access point 200 according to the logic shown in FIG. 4, for which a detailed description shall be given in the description which follows, can be performed by controller 324 of wireless LAN interface 322 or by the microprocessor 302 and the controller 324. However in the preferred embodiment the association and wireless connection to access point 200 is implemented entirely in controller 324 according to logic depicted in FIG. 4.

Figure 4:
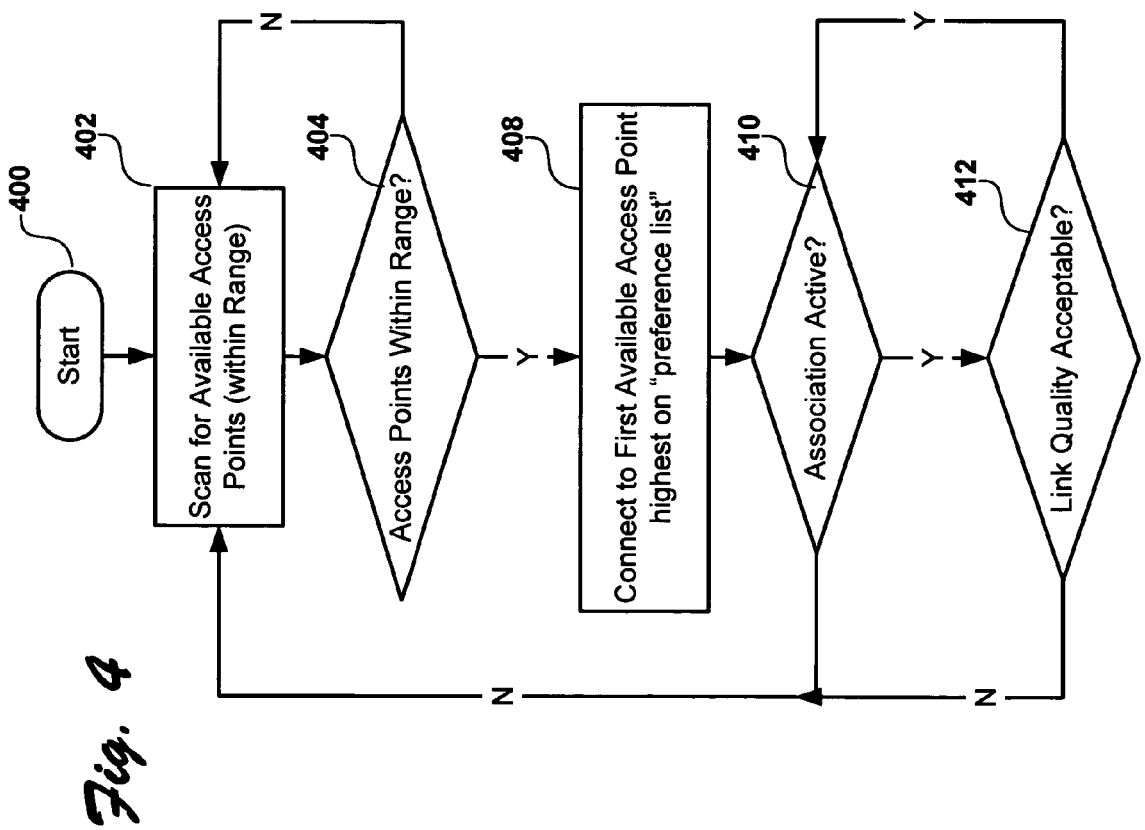
FIG. 4 is a flow diagram depicting the logic exercised by the client of FIG. 3 in maintaining and/or establishing association with the access point of FIG. 2.

FIG. 4 is a flow diagram depicting the logic exercised by the client of FIG. 3 in maintaining and/or establishing association with the access point of FIG. 2. Initially 400, client 300 scans 402 for any available access points with in its geographical range. A decision 404 is then made regarding whether access points are found. If none are found, client 300 continues to scan 402 for available access points. If one or more access points are found, client 300 will associate and connect 408 to the first available access point which is found to be highest on a predetermined preference list. The preference list can be entered by a user or entered automatically by system administrators through the network upon initial setup. A user would tend to enter, toward the top of list, the access points with which they have had the most success. Often, this is an access point closest to where the user normally physically resides and therefore, by virtue of its proximity to the user, provides the highest signal strength and gives the best signal quality. The client 300 then makes a two phase 410 and 412 determination as to the status of the association and link. First, a determination 410 is made as to whether the association remains active. If the association is not active, client 300 then continues to scan 402 for available access points. If the association is still active, client 300 then makes a determination 412 as to whether the link quality is acceptable. Link quality does not remain static for a variety of different reasons and therefore must be checked periodically. For example, if the client 300 is roaming, i.e., physically moving whether by public transit, automobile, or on foot, access point signal strength will diminish as the client moves away from the access point. Alternatively, link quality can degrade due to external electromagnetic interference. When it is determined 412 that the link quality is acceptable, client 300 maintains the association and proceeds to monitor the status 410 and the quality 412 of the connection. If it is determined 412 that the link quality is not acceptable, client 300 ventures out and scans 402 for alternative access points which might be available within its range in attempting to find a link with a higher level of signal quality.

Operational characteristics of client 300 shall be outlined in further detail as the written description ensues with respect to FIG. 7.

Figure 5:
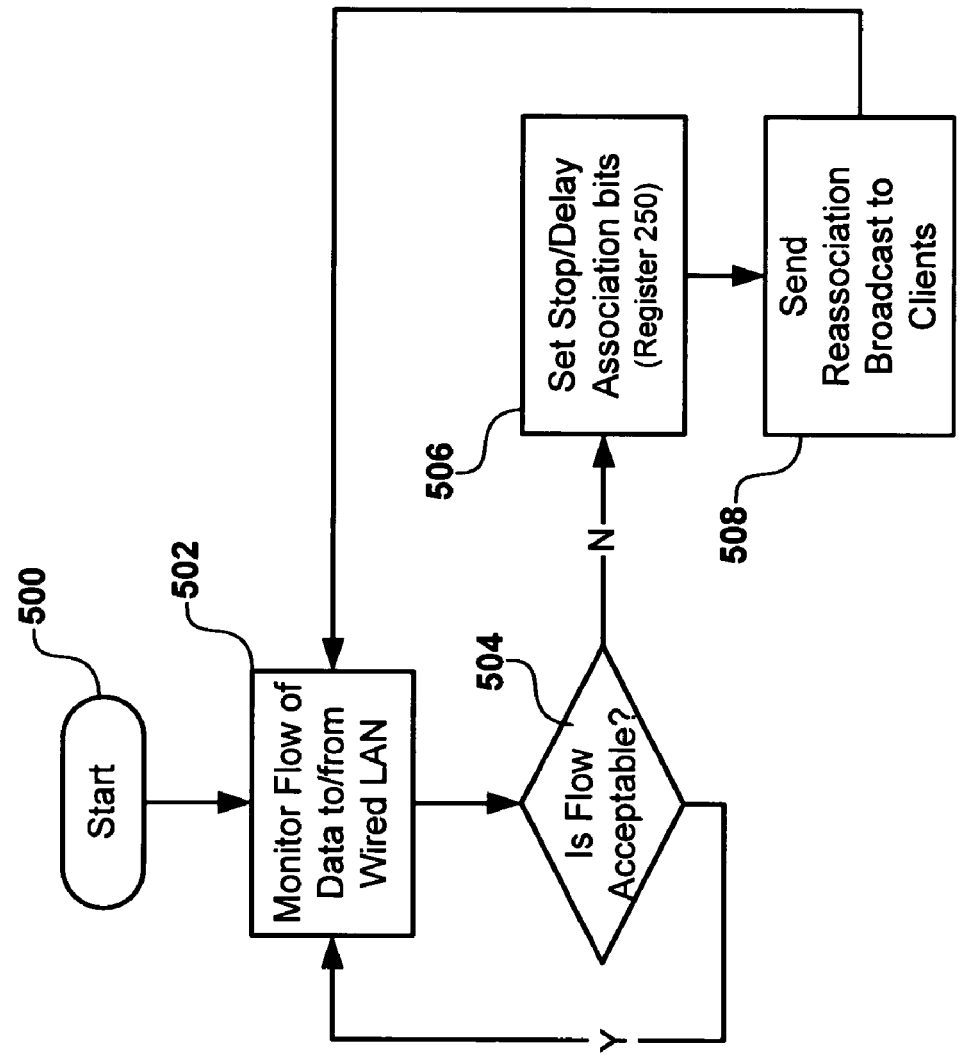
FIG. 5 is a flow diagram showing the logic exercised by the access point of FIG. 2 according to an embodiment of the present invention.

FIG. 5 is a flow diagram showing the logic exercised by the access point of FIG. 2 according to an embodiment of the present invention. Referring now to FIGS. 1, 2, and 5, an example will be given showing the operation of access point 200 in the case that backbone network 112 shown in FIG. 1 encounters a network outage or suffers a significantly degraded performance condition. Assume for the moment that backbone network 112 shown in FIG. 1 encounters a network outage, and assume that both clients 114 and 118 are associated to access point 102. In this case, both clients 114 and 118 will not be able to access the resources and services available on the backbone 112. However, it is still possible for client 114 to obtain access to backbone 110 through access point 106. This is achieved by the access point 200 in executing the logic shown in FIG. 5. Initially 500, access point 200 monitors 502 the flow of data to and from the wired LAN. The monitoring 502 is performed by the interface controller 206 of FIG. 2 by a traffic monitor 252 which monitors the LAN interface 212 for outages or degradation of performance. Alternatively, the monitoring 502 can be performed in software residing in memory 204 by microprocessor 210. In either implementation, the state of the backbone network is monitored by keeping track of packets and the time it takes to transfer them to and from the backbone. Actual transfer times are compared against preestablished times in determining whether the backbone is experiencing degraded performance. Additionally, aggregate bandwidth can be compared against predetermined thresholds in determining whether a degraded condition exists. A decision 504 is then made regarding the flow through the backbone. If it is decided 504 that the flow is acceptable, access point 200 maintains the status quo and continues to monitor 502 the flow on the backbone. If a decision 504 is made that the flow is unacceptable, a stop or delay bit is set 506 in a mitigation register 250 of controller 226 of wireless LAN interface 222 of FIG. 2. Alternatively to implementing a mitigation register 250, the stopping/halting and delaying to be described in relation to FIG. 6 can be performed in software residing in memory 204 by microprocessor 210. Referring again to FIGS. 1, 2, and 5, and responsive to a decision 504 that the flow is unacceptable, a broadcast is then sent 508 by access point 102 to clients associated to access point 102 requesting the associated clients 114 and 118 to reassociate. As an alternative to a broadcast, individual reassociation requests can be sent to each associated client. The access point continues by monitoring 502 the flow of data to and from the wired LAN.

Figure 6:
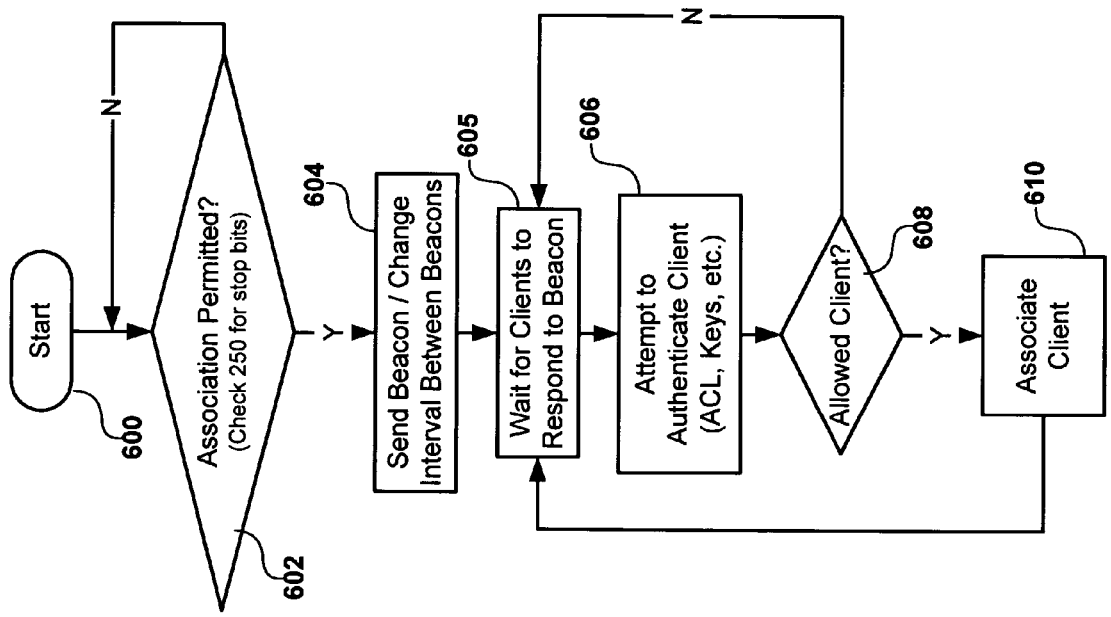
FIG. 6 is a flow diagram showing the logic exercised by the access point of FIG. 2 according to an embodiment of the present invention.

FIG. 6 is a flow diagram showing the logic exercised by the access point of FIG. 2 according to an embodiment of the present invention. The logic flow shown in FIG. 6 is executed independently of the logic shown in FIG. 5, although the two logic flows are interdependent as will be seen. Initially 600, a determination 602 is made as to whether the association of new clients is permitted. In the preferred embodiment, this is implemented by reading register 250 of FIG. 2 and determining whether the stop bit is set. Although the stop and delay bits of register 250 can be set arbitrarily, in the preferred embodiment the stop bit would be set in register 250 in cases where there is a total network outage. Conversely, in cases of degraded backbone network performance where the backbone is still available, it is preferable to set the delay bit and leave the stop bit disabled. In addition, the mitigation register 250 of FIG. 2 need not be limited to one or two bits but rather be implemented to store a plurality of bits indicating the value of delay desired depending on the severity of the degradation detected on the backbone network. If the stop bit of register 250 is set, no associations are committed and access point 200 simply continues in the loop in determining 602 whether associations are permitted. If the stop bit of register 250 is not set (disabled or deasserted), new associations to clients are permitted and the periodic transmission 604 of beacons identifying the access point 200 as available for association ensues. In absence of the delay bit of register 250, the transmission 604 of beacons occurs at a standard interval. If however, the delay bit of register 250 is set, the time interval between beacons is extended. In this way, new associations are either halted entirely or are delayed depending on the status of the backbone network. Preferably, associations are halted for a network outage condition, and delayed due to a degraded performance condition. By reducing the rate at which new beacons are sent 604, the likelihood is increased that a client listening for beacons will find another access point to associated with. The process of association then continues by waiting 605 for clients to respond to the beacons. When a client responds, an attempt 606 to authenticate the client then ensues. The authentication can be made by an access control list (ACL), by using private/public keys, or by any other known authentication method. Typically, a simple access control list is used in which system administrators maintain a list of known clients which are permitted to associate to the backbone network. However, when a higher degree of security is needed, it is preferable to use a public/private key encryption method. A determination 608 is then made, resulting from the attempt 606 to authenticate, as to whether the client is to be associated. If the client is not to be associated, association is not executed and the access point 200 continues to wait 605 for clients to respond to a beacon. If the determination 608 is that the client is to be associated, the client is then associated and connection to the backbone network is completed.

In FIG. 6, the delaying of the beacons to be sent 604, and the state in which the access point waits 605 for clients to respond, are primarily set forth for a passive client such as the client 300 shown in FIG. 3. In the case of an active client, an active client beacons for access rather than passively waiting to receive a beacon from an access point. Although the active client does not depend on receiving the beacon sent 604, the delay therein is applicable and beneficial in the case of an active client. Alternatively, in mixed scenario of passive and active clients, a specific embodiment can include the delay currently applied in sending 604 the beacons as a part of waiting 605 for clients to respond to the beacon or once a beacon has been sent from an active client.

FIG. 7 is a flow diagram depicting the logic exercised by the client of FIG. 3 in maintaining and/or establishing association with the access point of FIG. 2 wherein the client of FIG. 3 implements additional functionality capable of responding to a reassociation request transmitted by the access point of FIG. 2. Operation is similar to that of FIG. 4 with additional functionality in the client allows intelligent response by client 300 in response to receiving the reassociation request as transmitted 508 in FIG. 5. Initially 700, client 300 scans 702 for any available access points with in its geographical range. A decision 704 is then made regarding whether access points are found. If none are found, client 300 continues to scan 702 for available access points. If one or more access points are found, client 300 will associate and connect 708 to the first available access point which is found to be highest on a predetermined preference list. The preference list can be entered by a user or entered automatically by system administrators through the network upon initial setup. A user would tend to enter, toward the top of list, the access points with which they have had the most success. Often, this is an access point closest to where the user normally physically resides and therefore, by virtue of its proximity to the user, provides the highest signal strength and gives the best signal quality. The client 300 then makes a two phase 710 and 712 determination as to the status of the association and link. First, a determination 710 is made as to whether the association remains active. If the association is not active, client 300 then continues to scan 702 for available access points. If the association is still active, client 300 then makes a determination 712 as to whether the link quality is acceptable. If it is determined 712 that the link quality is not acceptable, client 300 ventures out and scans 702 for alternative access points which might be available within its range in attempting to find a link with a higher level of signal quality. When it is determined 712 that the link quality is acceptable, client 300 determines 714 whether a reassociation request has been received from the access point to which it is associated. If the determination 714 is that no reassociation request has been received, client 300 maintains the association and proceeds to monitor the status 710 of the connection. If the determination 714 is that a reassociation request has been received, client 300 ventures out and scans 702 for alternative access points which might be available within its range in attempting to find an access point which has an active backbone.

As discussed relative to FIG. 5, this would be the case for access point 102 of FIG. 1 in cases where it is still possible for client 114 to obtain access to backbone 110 through access point 106. Continuing that example, access point 102 would broadcast the reassociation request in response to a network outage or degraded performance condition. At the point where client 114 makes determination 714 of FIG. 7 that a reassociation request has been received from access point 102, client 300 ventures out and scans 702 for alternative access points and finds available access point 106 and initiates 700 a new association cycle with access point 106. Upon associating with new access point 106, client 114 then proceeds in removing the association with access point 102 which can involve a different type of reassociation request originating at the client 114 rather than at the access point.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
   a wired network interface;
   a wireless network interface which transmits a series of beacons according to a first interval, wherein each beacon identifies access capability through said wired network interface, and which associates clients through the wireless network interface for access through said wired network interface, the wireless network interface having a register for storing a variable which affects the operation of the wireless network interface; and
   a flow controller which is coupled to said wired network interface and said wireless network interface and which detects a degraded condition on said wired network interface that indicates a degradation on a wired network to which the wired network interface is connected and initiates the broadcast of a reassociation request across said wireless network interface in response to the detection on said wired network interface;
   wherein said flow controller stores only a single bit sized first value in the register in response to the degradation detected on said wired network interface and wherein said wireless network interface increases the interval between the beacon transmissions according to a second interval which is longer than the first interval in response to the first value being stored in the register; and
   wherein the degraded condition is selected from the group consisting of a reduced network throughput condition and a network outage condition.

2. Apparatus of claim 1 wherein said flow controller stores a bit sized second value in the register in response to the degradation detected on said wired network interface and wherein said wireless network interface halts beacon transmissions while the second value is stored in the register.

3. Apparatus of claim 1 wherein said flow controller stores a third value in the register in response to the degradation detected on said wired network interface and wherein said wireless network interface refuses the association of clients while the third value is stored in the register; wherein clients provided on said wireless network interface actively beacon in attempting to associate.

4. A method comprising:
   monitoring traffic on a wired network;
   transmitting a series of beacons by a wireless network interface over a wireless network according to a first interval, wherein each beacon identifies access capability to the wired network;
   associating clients on the wireless network for access to the wired network; detecting a degraded condition on the wired network based on said monitoring, the wired network being a backbone network, wherein the degraded condition is selected from the group consisting of a reduced network throughput condition and a network outage condition;
   storing only a single bit sized first value in a register in response to each degraded condition detected on said wired network interface;
   increasing the interval between said beacon transmissions according to a second interval which is longer than the first interval in response to said first value being stored in the register; and
   broadcasting a reassociation request to the associated clients on the wireless network in response to said detection on the wired network.

5. The method of claim 4 further comprising: halting said beacon transmissions in response to said detection on the wired network.

6. The method of claim 4 further comprising:
   denying further association of clients on the wireless network in response to said detection on the wired network;
   wherein the client attempts association by actively beaconing for access to the wired network.

7. A computer program product encoded on a computer readable storage medium comprising:
   computer readable program code stored therein, the computer readable program code in said computer program being effective to:
   monitor traffic on a wired network;
   transmit a series of beacons over a wireless network according to a first interval, wherein each beacon identifies access capability to the wired network;
   associate clients on the wireless network for access to the wired network;
   detect a degraded condition on the wired network based on said monitoring, the wired network being a backbone network, wherein the degraded condition is selected from the group consisting of a reduced network throughput condition and a network outage condition;
   store only a single bit sized first value in a register in response to each degraded condition detected on said wired network interface;
   broadcast a reassociation request to the associated clients on the wireless network in response to said detection on the wired network; and
   increase the interval between said beacon transmissions according to a second interval which is longer than the first interval in response to said first value being stored in the register.

8. The computer program product of claim 7 wherein the code is further effective to:
   halt said beacon transmissions in response to said detection on the wired network.

9. The computer program product of claim 7 wherein the code is further effective to:
   deny further association of clients on the wireless network in response to said detection on the wired network;
   wherein the client attempts association by actively beaconing for access.

* * * * *

UNITED STATES PATENT AND TRADEMARK OFFICE
CERTIFICATE OF CORRECTION

PATENT NO. : 7,652,995 B2  Page 1 of 1
APPLICATION NO. : 10/742422
DATED : January 26, 2010
INVENTOR(S) : Cromer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this

Twenty-third Day of November, 2010

David J. Kappos
*Director of the United States Patent and Trademark Office*